US012602409B2

(12) United States Patent
Takemura et al.

(10) Patent No.: US 12,602,409 B2
(45) Date of Patent: Apr. 14, 2026

(54) INFORMATION SEARCH SYSTEM

(71) Applicant: JFE STEEL CORPORATION, Tokyo (JP)

(72) Inventors: Yusuke Takemura, Tokyo (JP); Akira Kariya, Tokyo (JP); Satoshi Kuwabara, Tokyo (JP); Ayaka Eto, Tokyo (JP); Nobuyuki Morooka, Tokyo (JP); Daiki Shigeoka, Tokyo (JP); Shudo Takenaka, Tokyo (JP); Daigo Ito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 225 days.

(21) Appl. No.: 17/999,850

(22) PCT Filed: May 25, 2021

(86) PCT No.: PCT/JP2021/019885
§ 371 (c)(1),
(2) Date: Nov. 24, 2022

(87) PCT Pub. No.: WO2021/241602
PCT Pub. Date: Dec. 2, 2021

(65) Prior Publication Data
US 2023/0222145 A1 Jul. 13, 2023

(30) Foreign Application Priority Data
May 28, 2020 (JP) ................................. 2020-093683

(51) Int. Cl.
*G06F 16/3329* (2025.01)
*G06F 16/3332* (2025.01)
*G06F 16/383* (2019.01)

(52) U.S. Cl.
CPC ...... *G06F 16/3329* (2019.01); *G06F 16/3334* (2019.01); *G06F 16/383* (2019.01)

(58) Field of Classification Search
CPC ............. G06F 16/3329; G06F 16/3334; G06F 16/383; G06F 16/248; G06F 16/258; G06F 16/24561
See application file for complete search history.

(56) References Cited

U.S. PATENT DOCUMENTS 5,819,261 A * 10/1998 Takahashi ............... G06F 16/48
9,213,709 B2 12/2015 Patiejunas et al.
(Continued)

FOREIGN PATENT DOCUMENTS

CN 1744080 A 3/2006
CN 104603740 B 3/2018
(Continued)

OTHER PUBLICATIONS

Aug. 31, 2021, International Search Report issued in the International Patent Application No. PCT/JP2021/019885.
(Continued)

*Primary Examiner* — Bhavesh M Mehta
*Assistant Examiner* — Cameron Kenneth Young
(74) *Attorney, Agent, or Firm* — KENJA IP LAW PC

(57) ABSTRACT

Provided is an information search system by which high-speed search is possible commonly used across a plurality of districts, the system including: a database (12) that stores a plurality of pieces of information that are text-searchable; a query sentence acceptance unit (26) that accepts a query sentence; an inputted search keyword extractor (44) that extracts an inputted search keyword from the query sentence; a retrieval executor (40) that executes retrieval processing from the database using the inputted search keyword; a local management apparatus (100) that stores
(Continued)

district material in a local database (104); and an information management apparatus (110) that executes character extraction processing on the material stored in the local database and converts a file format of the material according to a size thereof, stores the material in a temporary memory as stored material, and outputs the stored material to the database.

5 Claims, 9 Drawing Sheets

(56) References Cited

U.S. PATENT DOCUMENTS

| | | | |
|---|---|---|---|
| 10,990,591 B2 * | 4/2021 | Kurabayashi | G06F 16/24535 |
| 2003/0041058 A1 * | 2/2003 | Ibuki | G06F 16/24522 |
| 2003/0078766 A1 * | 4/2003 | Appelt | G06F 16/3338 |
| | | | 707/E17.084 |
| 2005/0138018 A1 * | 6/2005 | Sakai | G06F 16/355 |
| 2006/0015486 A1 | 1/2006 | Nomiyama et al. | |
| 2008/0082527 A1 | 4/2008 | Yachiku et al. | |
| 2009/0313574 A1 * | 12/2009 | Shih | G06F 3/0483 |
| | | | 715/811 |
| 2016/0315891 A1 * | 10/2016 | Mutha | H04L 51/063 |
| 2017/0193038 A1 * | 7/2017 | Zhang | G06F 40/30 |
| 2019/0079928 A1 | 3/2019 | Kumar et al. | |
| 2020/0050949 A1 * | 2/2020 | Sundararaman | G06F 40/284 |
| 2021/0248153 A1 * | 8/2021 | Sirangimoorthy | G06F 16/258 |

FOREIGN PATENT DOCUMENTS

| | | | |
|---|---|---|---|
| EP | 2515248 A1 | 10/2012 | |
| JP | 2003114855 A | 4/2003 | |
| JP | 2005165986 A | 6/2005 | |
| JP | 2005182280 A | 7/2005 | |
| JP | 2009110231 A | 5/2009 | |
| JP | 2009271573 A | 11/2009 | |
| JP | 2017188000 A | 10/2017 | |
| JP | 2019121392 A | 7/2019 | |
| KR | 1020080030480 A | 4/2008 | |
| TW | 201423043 A | 6/2014 | |
| TW | I497035 B | 8/2015 | |
| TW | I578175 B | 4/2017 | |
| TW | I615727 B | 2/2018 | |
| TW | 202018529 A | 5/2020 | |

OTHER PUBLICATIONS

Ayaka Eto et al., Development of Control Maintenance Support System, JFE GIHO, Feb. 2020, pp. 54-58, No. 45; also published in English in JFE Technical Report, Mar. 2021, pp. 57-61, No. 26.
Nov. 4, 2021, Office Action issued by the Taiwan Intellectual Property Office in the corresponding Taiwanese Patent Application No. 110119281 with English language Search Report.
Oct. 5, 2023, the Extended European Search Report issued by the European Patent Office in the corresponding European Patent Application No. 21813981.4.
Sep. 2, 2025, Office Action issued by the Korean Intellectual Property Office in the corresponding Korean Patent Application No. 10-2022-7041836 with English language concise statement of relevance.
Liu Hao, Cloud Computing Architecture and Technical Practices, May 31, 2019, China Machine Press, p. 7 with a partial English translation.
Nov. 1, 2025, Office Action issued by the China National Intellectual Property Administration in the corresponding Chinese Patent Application No. 202180036732.4 with English language concise statement of relevance.

* cited by examiner

| | | Synonyms | | | Words having similar meanings | |
|---|---|---|---|---|---|---|
| 1 | Equipment AA | Equipment ○○ | Equipment A'A' | A" A" | ⋯ | aaa | a'a'a' | ⋯ |
| 2 | Apparatus ××| Apparatus BB | Gear B'B' | B" B" | ⋯ | bbb | b'b'b' | ⋯ |
| 3 | Failure CC | Error C'C' | C" C" | Failure △△ | ⋯ | ccc | c'c'c' | ⋯ |
| 4 | Part DD | Model D'D' | Part □□ | D" D" | ⋯ | ddd | d'd'd' | ⋯ |
| ⋮ | ⋮ | ⋮ | ⋮ | ⋮ | ⋮ | ⋮ | ⋮ |

| Type | | Information-type determining keywords | | | |
|---|---|---|---|---|---|
| A | Failure case | Failure | Similar example | · · · | · · · |
| B | Manual | Failure type | Replacement procedure | · · · | · · · |
| C | · · · | · · · | · · · | · · · | · · · |
| D | · · · | · · · | · · · | · · · | · · · |
| · · | · · · | · · · | · · · | · · · | · · · |

What is the cause of inverter tripping?    Search (Search results)

Figure 6:
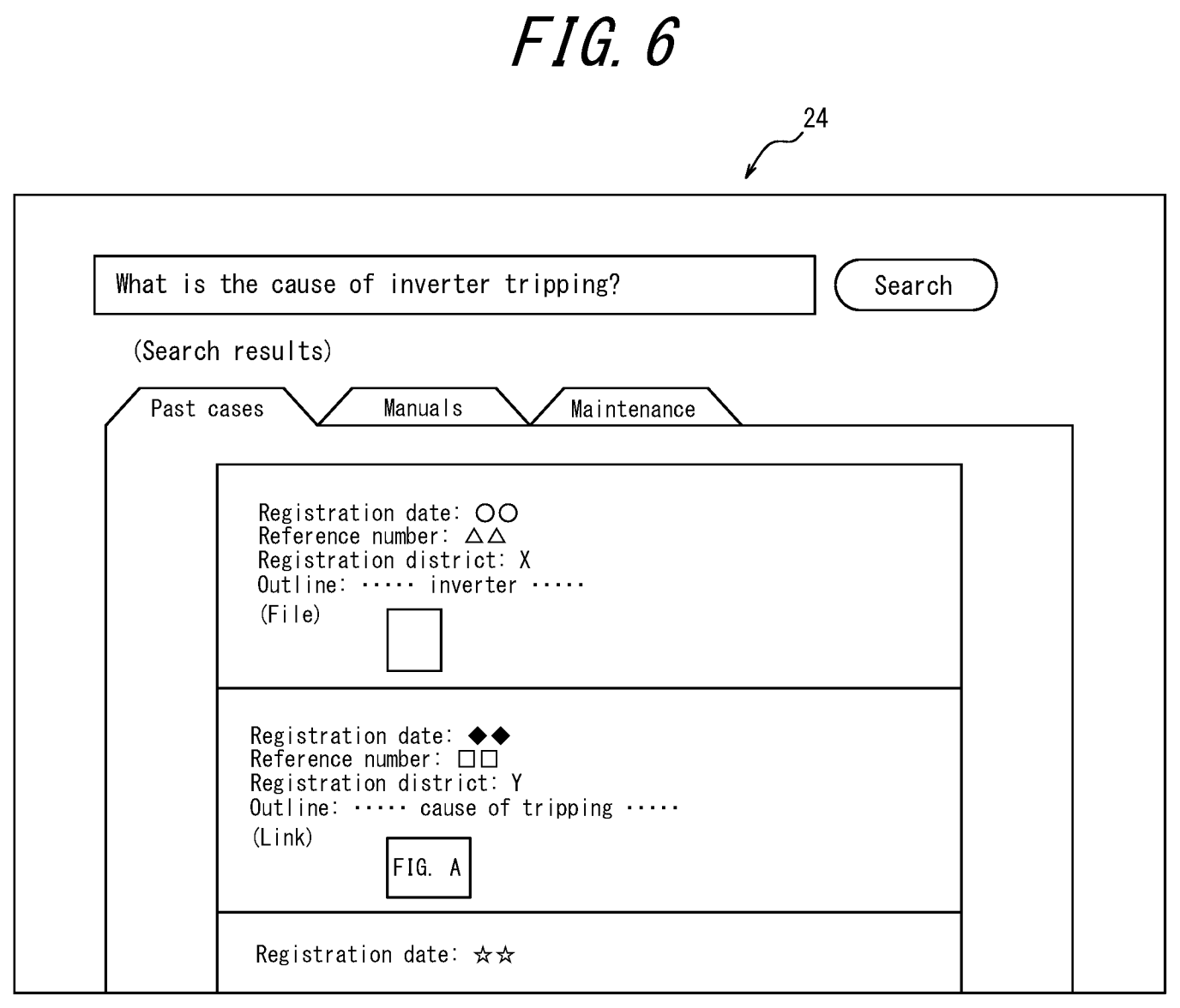

Past cases    Manuals    Maintenance

Registration date: ○○
Reference number: △△
Registration district: X
Outline: ······ inverter ······
(File)

Registration date: ◆◆
Reference number: □□
Registration district: Y
Outline: ······ cause of tripping ······
(Link)

FIG. A

Registration date: ☆☆

FIG. 7

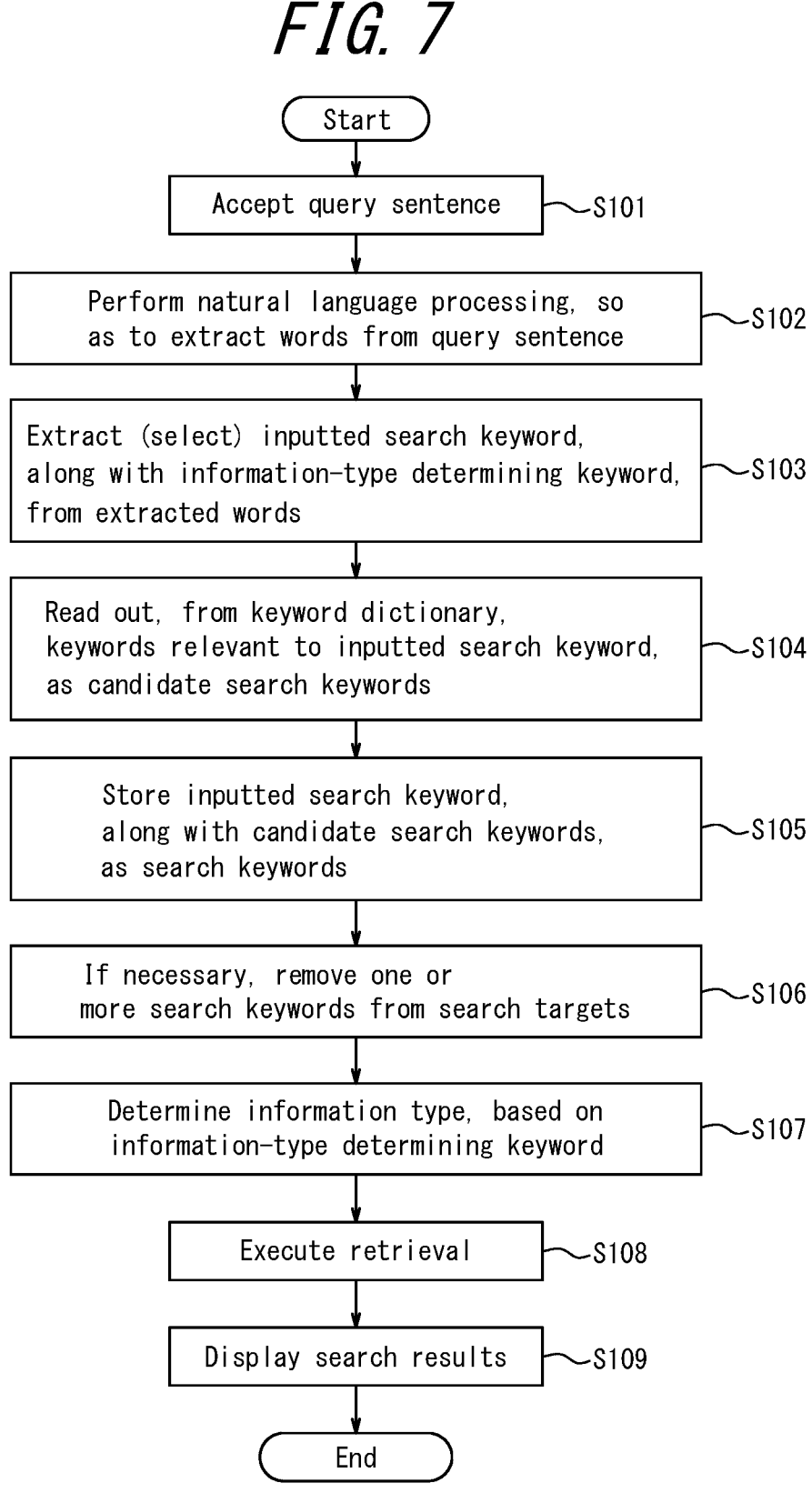

Start

Accept query sentence ⌐∽S101

Perform natural language processing, so
as to extract words from query sentence ⌐∽S102

Extract (select) inputted search keyword,
along with information-type determining keyword,
from extracted words ⌐∽S103

Read out, from keyword dictionary,
keywords relevant to inputted search keyword,
as candidate search keywords ⌐∽S104

Store inputted search keyword,
along with candidate search keywords,
as search keywords ⌐∽S105

If necessary, remove one or
more search keywords from search targets ⌐∽S106

Determine information type, based on
information-type determining keyword ⌐∽S107

Execute retrieval ⌐∽S108

Display search results ⌐∽S109

End

FIG. 9
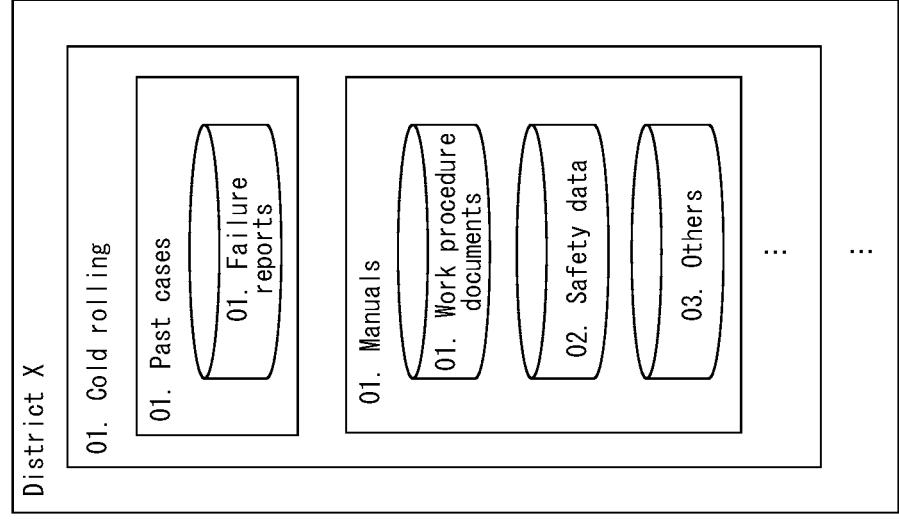
| District | Classification | Category 1 | Category 2 | ... | File link information | Extracted character information |
|---|---|---|---|---|---|---|
| District X | 01. Cold rolling | 01. Past cases | 01. Failure reports | ... | *** | *** |
| ... | ... | ... | ... | ... | ... | ... |

INFORMATION SEARCH SYSTEM

TECHNICAL FIELD

The present disclosure relates to an information search system.

BACKGROUND

Data written on paper (paper data) has been used as material for maintenance operations in manufacturing and other industries. It is important to digitize such paper data and store it together into databases in information search systems for maintenance operations. Advances in retrieval technology have improved the accuracy of search results, and paper data is being digitized and compiled into databases.

For example, in manufacturing industries, failures and faults of apparatuses or the like, their causes and solutions, and so on are compiled into databases every time they occur, and the databases are referred to as past cases in the event of similar failures or faults, so as to prevent failures and shorten recovery times. The databases also contain information, such as work standards or manuals. The amount of information stored in the databases is therefore enormous.

Examples of conventional methods of acquiring necessary information from such an enormous amount of data include text search processing in which a given string is used as a keyword and any data matching the keyword is outputted as search results. For example, Patent Literature 1 describes an information search system that enables even those with limited knowledge and experience who have difficulty in entering an appropriate keyword to achieve good search results.

CITATION LIST

Patent Literature

PTL 1: JP 2019-121392 A

SUMMARY

Technical Problem

Here, in a case in which factories, offices, or the like located in multiple districts use a common information search system, high-speed search may not be possible if material is uniformly collected from the multiple districts, due to an increased size of the database.

It would be helpful to provide an information search system by which high-speed search is possible even in a case in which it is commonly used across a plurality of districts.

Solution to Problem

An information search system according to the present disclosure includes:

a database configured to store a plurality of pieces of information that are text-searchable;

a query sentence acceptance unit configured to accept a query sentence in a natural language format;

an inputted search keyword extractor configured to extract an inputted search keyword from the query sentence;

a retrieval executor configured to execute retrieval processing from the database using the inputted search keyword, along with a keyword relevant to the inputted search keyword;

a local management apparatus configured to store district material in a local database; and an information management apparatus configured to execute character extraction processing on the material stored in the local database and convert a file format of the material according to a size thereof, store the material in a temporary memory as stored material, and output the stored material to the database.

Advantageous Effect

According to the present disclosure, an information search system by which high-speed search is possible even in a case in which it is commonly used across a plurality of districts can be provided.

BRIEF DESCRIPTION OF THE DRAWINGS

In the accompanying drawings:

FIG. 3 illustrates examples of information-type determining keywords that are stored in an information-type determining dictionary;

FIG. 6 illustrates search results that are displayed;

FIG. 7 is a flowchart illustrating information search operations of the information search system according to the embodiment;

FIG. 9 illustrates a language retrieval processing database.

DETAILED DESCRIPTION

In the present embodiment, an information search system that compiles a text-searchable information database from equipment maintenance work information in manufacturing industries will be described by way of an example. The information search system enables a searcher to retrieve information on useful past cases from the database when a failure or fault occurs, by entering the situation as a sentence. The searcher can perform recovery work based on the retrieved information. Herein, the equipment maintenance work information includes, for example, information, such as work standards or manuals that describe failures and faults of apparatuses or the like, their causes and solutions, and so on. In the following, cases related to failures or faults may be referred to as "failure cases."

The intended use of retrieval using the information search system according to the present disclosure is not limited to the above. The information search system according to the present disclosure can be used for other intended uses than to assist in equipment maintenance work, such as equipment failure recovery work. The information search system according to the present disclosure can be applied, for example, in the field of sales, in order to retrieve past cases and provide optimal responses to customer inquiries. The information search system according to the present disclosure can be applied, for example, in the field of product design, in order to search for similar manufacturing records or literatures, such as technical papers, and suggest optimal product designs, in response to requests from customers.

Figure 1:
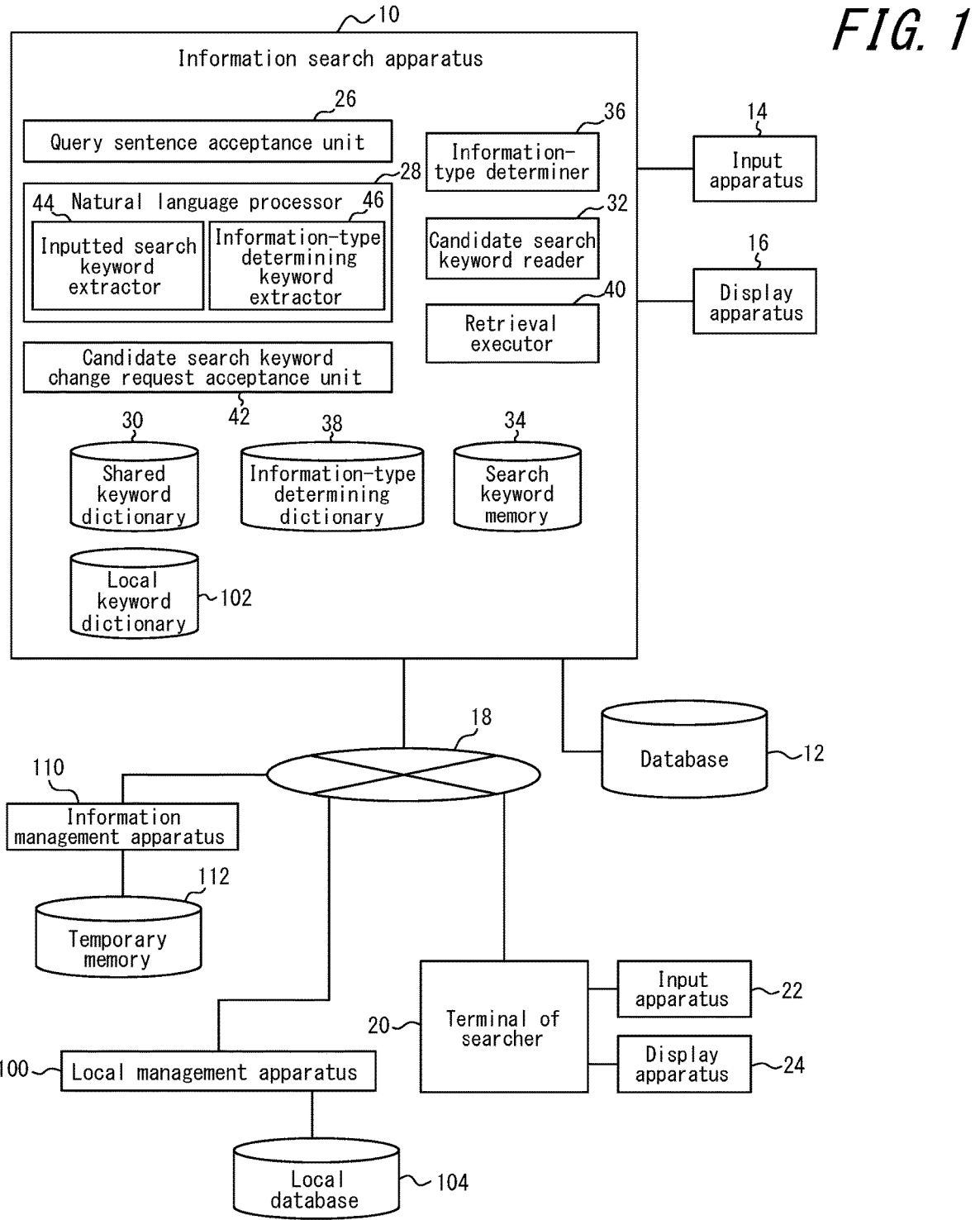
FIG. 1 is a block diagram illustrating a schematic configuration of an information search system according to an embodiment of the present disclosure.

FIG. 1 is a block diagram illustrating a schematic configuration of the information processing system according to the embodiment of the present disclosure. The information search system is configured to include an information search apparatus 10 that executes search processing, a database 12 that stores a plurality of pieces of information that are text-searchable, an input apparatus 14, such as a keyboard or a mouse, that is connected to the information search apparatus 10, and a display apparatus 16, such as a display, that is connected to the information search apparatus 10. The information search system is also configured to include a terminal 20 of a searcher, a local management apparatus 100, and an information management apparatus 110 that are connected to the information search apparatus 10 via a network 18.

The network 18 is a communication network, such as a Local Area Network (LAN). The network 18 is, however, not limited to this. The network 18 may be a public communication network, such as the Internet, or a communication network, such as a Wide Area Network (WAN) or a Virtual Private Network (VPN), that extends across a general public network. The information search apparatus 10, the terminal 20 of the searcher, the local management apparatus 100, and the information management apparatus 110 are each embodied by a computer and a program. Examples of the terminal 20 of the searcher may include a Personal Computer (PC) and a tablet computer, and an input apparatus 22 and a display apparatus 24 may be connected to or integrated with the terminal 20 of the searcher. Examples of the local management apparatus 100 include a personal computer with a local database 104. The local management apparatus 100 may include an input apparatus and a display apparatus. Examples of the information management apparatus 110 include a personal computer with a temporary memory 112. The information management apparatus 110 may include an input apparatus and a display apparatus.

Herein, the configuration of the information search system of FIG. 1 is an example, and some of the components may be omitted. The information search system may also include other components. For example, the information search system may be configured without the input apparatus 14 and the display apparatus 16, and information may be inputted or outputted using a terminal 20 of a searcher. The information search system may also include a plurality of local management apparatuses 100 located in a plurality of districts. In the present embodiment, the information search system includes a plurality of local management apparatuses 100, although only one local management apparatus 100 is illustrated in FIG. 1 because their configurations are the same. Each of the plurality of local management apparatuses 100 is physically arranged in the corresponding one of the plurality of districts that commonly use the information search system.

The database 12 includes a file storage area in which documents, drawings, photographs, or the like are stored. Sentences are not limited to originally inputted text, and they may include text converted from audio using a speech recognition engine, or text converted from sentences written on a paper medium using Optical Character Recognition (OCR). In a case in which drawings or photographs are stored, search processing can be performed on characters embedded in the drawings or on the file names. Information stored in the database 12 includes information, such as work standards, manuals, or the like, on failures and faults of apparatuses or the like, their causes and solutions, and so on. In the present embodiment, the database 12 contains a plurality of failure cases. It is preferable that file management is performed using the same hierarchical structure in both the temporary memory 112 and the file storage area.

Further, the database 12 is configured to include a language retrieval processing database, which is associated with material stored in the aforementioned file storage area and which is used by a retrieval executor 40 to perform language retrieval processing. As will be described later, the language retrieval processing database contains character information obtained from processing performed by the information management apparatus 110 on material stored in the local database 104, hierarchical information for the material in the local database 104, and link information to compressed material stored in the database 12. Since the database 12 includes the language retrieval processing database, the retrieval executor 40 does not need to directly search for material stored in the database 12 but only needs to search the language retrieval processing database in order to efficiently retrieve material.

Here, as illustrated in FIG. 9, for example, the language retrieval processing database is a Relational Database (RDB) from which data under the column headings for districts in which past cases exist, classifications, types such as past cases (category 1), types of documents (category 2), links to files, character information extracted from files, or the like can be extracted. The language retrieval processing database may be configured to store these categories all together as a single record. The language retrieval processing database may be configured to store these categories separately in different tables, and the different tables may be joined using identification information (such as an ID number) as a key.

The amount of information retrievable from the database 12 increases, by regularly adding material stored in local databases 104 located in a plurality of districts. As will be described in detail later, material stored in a local database 104 for each district is converted into a file format suitable for storage in the database 12 by the information management apparatus 110, and the converted material is stored in the temporary memory 112 as stored material. The information management apparatus 110 regularly outputs stored material in the temporary memory 112 at the same time as the amount of information in the database 12 increases. That is, the material stored in the local databases 104 for the respective districts are incorporated into the database 12, after the file formats are converted by the information management apparatus 110. At the same time, necessary data records are added to the language retrieval processing database.

The information search apparatus 10 is configured to include a query sentence acceptance unit 26, a natural language processor 28, a shared keyword dictionary 30, a local keyword dictionary 102, a candidate search keyword reader 32, a search keyword memory 34, an information-type determiner 36, an information-type determining dictionary 38, a retrieval executor 40, and a candidate search keyword change request acceptance unit 42. The natural language processor 28 includes an inputted search keyword extractor 44 and an information-type determining keyword extractor 46. Herein, the configuration of the information search apparatus 10 of FIG. 1 is an example, and some of the components may be omitted. The information search apparatus 10 may also include other components. For example, the information search apparatus 10 may be configured without the shared keyword dictionary 30, the local keyword dictionary 102, and the information-type determining dictionary 38, and these dictionaries may be located outside the information search apparatus 10 and accessed via the network 18.

Generally speaking, these functional blocks have the following functions. The query sentence acceptance unit 26 sequentially accepts, through the network 18, a query sentence in a natural language format that has been entered by a searcher via the input apparatus 22 of a terminal 20 of the searcher. For example, query sentences, such as "A failure of the apparatus xx has occurred in the equipment oo. Are there any similar examples in the past?", "What are the failures with the failure type ΔΔ?", "What is the procedure for replacing the part □□?", or "What is the cause of inverter tripping?", may be sequentially inputted to the terminal 20 of the searcher in the natural language format.

The natural language processor 28 performs natural language processing, such as known morphological analysis, on a query sentence received by the query sentence acceptance unit 26, so as to extract words. The inputted search keyword extractor 44 of the natural language processor 28 extracts, from the inputted query sentence, an inputted search keyword to be used for retrieval. For this extraction, the inputted search keyword extractor 44 can refer, for example, to the shared keyword dictionary 30 and the local keyword dictionary 102, which will be explained in detail later, so as to extract a word registered in the shared keyword dictionary 30 or the local keyword dictionary 102 as the inputted search keyword. For example, in a case in which the query sentences "A failure of the apparatus xx has occurred in the equipment oo. Are there any similar examples in the past?" are inputted, the inputted search keyword extractor 44 extracts the words "equipment oo" and "apparatus xx" as inputted search keywords. For example, in a case in which the query sentence "What are the failures with the failure type ΔΔ?" is inputted, the inputted search keyword extractor 44 extracts the word "failure ΔΔ" as an inputted search keyword. For example, in a case in which the query sentence "What is the procedure for replacing the part □□?" is inputted, the inputted search keyword extractor 44 extracts the word "part □□" as an inputted search keyword. For example, in a case in which the query sentence "What is the cause of inverter tripping?" is inputted, the inputted search keyword extractor 44 extracts the words "inverter" and "tripping" as inputted search keywords.

The information-type determining keyword extractor 46 of the natural language processor 28 extracts, from an inputted query sentence, an information-type determining keyword that is to be used to determine an information type corresponding to the purpose of the search. For this extraction, the information-type determining keyword extractor 46 can refer to the information-type determining dictionary 38, which will be described in detail later, so as to extract a word registered in the information-type determining dictionary 38 as the information-type determining keyword. For example, in a case in which the query sentences "A failure of the apparatus xx has occurred in the equipment oo. Are there any similar examples in the past?" are inputted, the information-type determining keyword extractor 46 extracts the words "failure" and "similar example" as information-type determining keywords. For example, in a case in which the query sentence "What are the failures with the failure type ΔΔ?" is inputted, the information-type determining keyword extractor 46 extracts the word "failure type" as an information-type determining keyword. For example, in a case in which the query sentence "What is the procedure for replacing the part □□?" is inputted, the information-type determining keyword extractor 46 extracts the word "replacement procedure" as an information-type determining keyword. For example, in a case in which the query sentence "What is the cause of inverter tripping?" is inputted, the information-type determining keyword extractor 46 extracts the word "cause" as an information-type determining keyword.

In the shared keyword dictionary 30, relevant keywords are registered and stored in advance in association with each other. In the present embodiment, keywords that are synonymous with each other are registered in association with each other in the shared keyword dictionary 30. Keywords that have similar meanings to each other are also registered in association with each other in the shared keyword dictionary 30. It is to be noted, however, that only the keywords that are synonymous with each other, or only the keywords that have similar meanings to each other may be registered in the shared keyword dictionary 30. Alternatively, or in addition, keywords that are considered to be highly relevant to each other can be registered in advance in association with each other.

Figure 2:
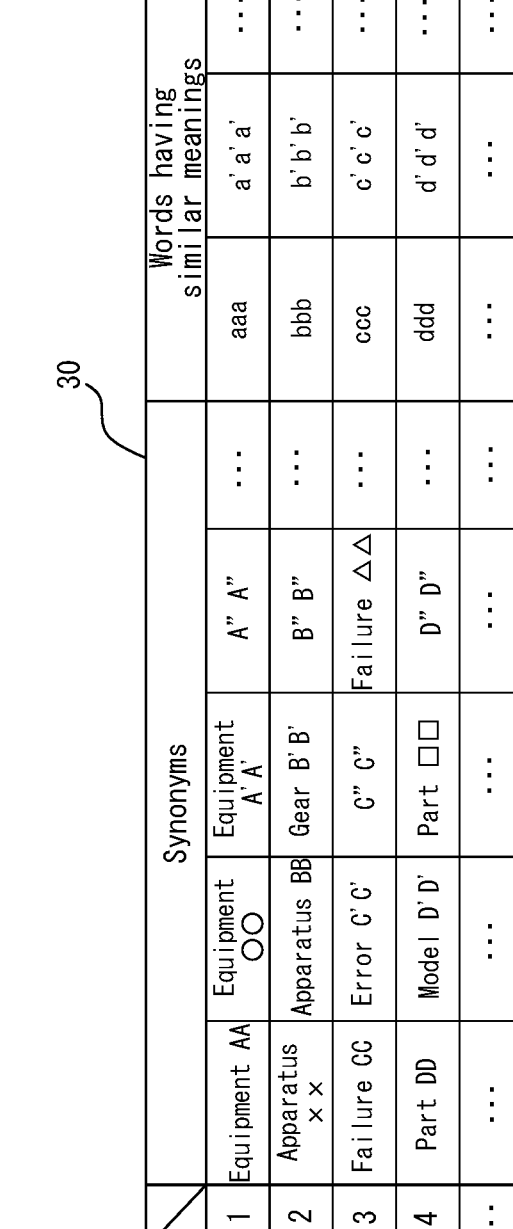
FIG. 2 illustrates examples of keywords stored in a shared keyword dictionary.

FIG. 2 illustrates examples of keywords registered in advance in the shared keyword dictionary 30. Keywords belonging to the same row are relevant to each other and are associated with each other.

The candidate search keyword reader 32 refers to the shared keyword dictionary 30 every time the inputted search keyword extractor 44 extracts an inputted search keyword, so as to read out keywords that are relevant to the inputted search keyword as candidate search keywords. For example, in a case in which an inputted search keyword is "equipment oo", the candidate search keyword reader 32 reads out, from the shared keyword dictionary 30, "equipment ΔΔ", "equipment A'A'", and "A"A" " as the synonyms, and "aaa" and "a'a'a'" as words having similar meanings. That is, the candidate search keyword reader 32 reads out "equipment ΔΔ", "equipment A'A'", "A"A"", "aaa", and "a' a' a'" as candidate search keywords. At this time, the candidate search keyword reader 32 may read out not all, but only some of the synonyms and the words having similar meanings from the shared keyword dictionary 30 and use them as candidate search keywords. In one example, the candidate search keyword reader 32 may read out only the synonyms.

The local keyword dictionary 102 registers district keywords that are keywords used in particular districts. The district keywords may be registered in the local keyword dictionary 102 by an administrator. As is the case with the shared keyword dictionary 30, keywords belonging to the same row are relevant to each other and are associated with each other in the local keyword dictionary 102. As is the case with the shared keyword dictionary 30, keywords that are synonymous with each other are registered in association with each other in the local keyword dictionary 102. As is the case with the shared keyword dictionary 30, keywords that have similar meanings to each other are also registered in association with each other in the local keyword dictionary 102. Since the local keyword dictionary 102 registers district keywords and is preferentially referred to by the candidate search keyword reader 32, it is not necessary to manage all terms in the shared keyword dictionary 30. This prevents a decrease in search speed due to an increase in the size of the shared keyword dictionary 30. The local keyword dictionary 102 may be provided in plurality, and the plurality of local keyword dictionaries 102 may register district keywords for different districts. Alternatively, the local keyword dictionary 102 may be the only one provided, and local keyword dictionary 102 is configured to determine in which district each registered district keyword is used.

In the present embodiment, in a case in which an inputted search keyword is not registered in the local keyword dictionary 102, the candidate search keyword reader 32 refers to the shared keyword dictionary 30, so as to read out keywords that are relevant to the inputted search keyword as candidate search keywords. As mentioned above, a district keyword is a keyword used in the particular district. A district keyword may, for example, be a word that is used only in factories or offices in the limited district, or it may be a word that has corresponding shared words but is customarily used in the limited district. For example, in a case in which there are a plurality of local keyword dictionaries 102, a district keyword for district X is registered in a local keyword dictionary 102 for district X. For example, in a case in which there is one keyword dictionary 102, a district keyword for district X is linked with district X and registered in the local keyword dictionary 102. In a case in which an inputted search keyword is registered in the local keyword dictionary 102, the candidate search keyword reader 32 reads out relevant keywords from the local keyword dictionary 102 as candidate search keywords. In a case in which an inputted search keyword is not registered in the local keyword dictionary 102, the candidate search keyword reader 32 refers to the shared keyword dictionary 30. For example, in a case in which an inputted search keyword is "equipment XX", which is a district keyword, the candidate search keyword reader 32 reads out, from the local keyword dictionary 102, "equipment EE" as its synonym, along with "equipment X'X'" as a word having a similar meaning, as candidate search keywords.

Herein, in the local keyword dictionary 102, district keywords may be associated with keywords registered in the shared keyword dictionary 30. In this instance, in a case in which an inputted search keyword is a district keyword, the candidate search keyword reader 32 may refer to the shared keyword dictionary 30 and the local keyword dictionary 102, so as to read out keywords relevant to the inputted search keyword. For example, in the local keyword dictionary 102, "equipment XX", which is a district keyword, may be associated with "equipment oo" that is registered in the shared keyword dictionary 30 as a word having a similar meaning. For example, in a case in which an inputted search keyword is "equipment XX", the candidate search keyword reader 32 refers to the local keyword dictionary 102, so as to read out "equipment oo", and also refers to the shared keyword dictionary 30, so as to read out "equipment ΔΔ", "equipment A'A'", "A"A"", "aaa", and "a'a'a'", as candidate search keywords. By referring to both the shared keyword dictionary 30 and the local keyword dictionary 102, the candidate search keyword reader 32 can set candidate search keywords without missed keywords.

The search keyword memory 34 stores an inputted search keyword and candidate search keywords that are acquired as described above, as search keywords. When, for example, a query sentence is additionally inputted, the search keyword memory 34 may cumulatively store an additional inputted search keyword, along with additional candidate search keywords, as search keywords.

The information-type determiner 36 determines the purpose of search, based on an information-type determining keyword that has been extracted from a query sentence. The information-type determiner 36 refers to the information-type determining dictionary 38 and determines an information type to be retrieved, based on the information-type determining keyword. FIG. 3 illustrates examples of information-type determining keywords stored in the information-type determining dictionary 38. In the information-type determining dictionary 38, information-type determining keywords, which can be extracted from query sentences, and information types that correspond with the information-type determining keywords are registered in association with each other. For example, "failure case" is registered as an information type of the information-type determining keywords "failure" and "similar example." For example, "manual" is registered as an information type of the information-type determining keywords "failure type" and "replacement procedure." On the other hand, information stored in the database 12 is classified into a plurality of groups by information type for management purposes. For example, in the database 12, any "failure case" may be stored under one folder named "past cases", and any "manual" may be stored under another folder.

The retrieval executor 40 performs text-based retrieval processing on information stored in the database 12 using search keywords stored in the search keyword memory 34. That is, the retrieval executor 40 executes retrieval processing from the database 12 using an inputted search keyword, along with keywords relevant to the inputted search keyword. The retrieval executor 40 performs retrieval processing on information that belongs to a group corresponding at least to the information type determined by the information-type determiner 36 among the plurality of groups in the database 12.

The candidate search keyword change request acceptance unit 42 accepts, from a searcher, additions and deletions to and from words registered in the shared keyword dictionary 30 and the local keyword dictionary 102. For example, the searcher can add new words that have similar meanings, so that the retrieval executor 40 can execute retrieval processing by which missed retrieval is further prevented.

Each local management apparatus 100 is located in a corresponding one of a plurality of districts that commonly use the information search system, so as to manage a local database 104 for the district. The local management apparatus 100 may include an input apparatus, for example, and it may be operated by an administrator of the district.

Each local database 104 stores material generated at factories or offices in the district. The generated material may be automatically stored in the local database 104 by a system of the district, including the local management apparatus 100, or it may be stored in the local database 104 by the administrator. Examples of the material stored in the local database 104 include material on failure cases of apparatuses or the like, manuals, and so on. Material stored in the local database 104 is converted into a file format suitable for the database 12 by the information management apparatus 110 as described above, and the converted material is regularly stored in the database 12.

The information management apparatus 110 converts file formats of material stored in the local databases 104 located in the plurality of districts, and stores it in the temporary memory 112 as stored material. The information management apparatus 110 regularly outputs stored material at the same time as the amount of information in the database 12 increases.

Figure 4:
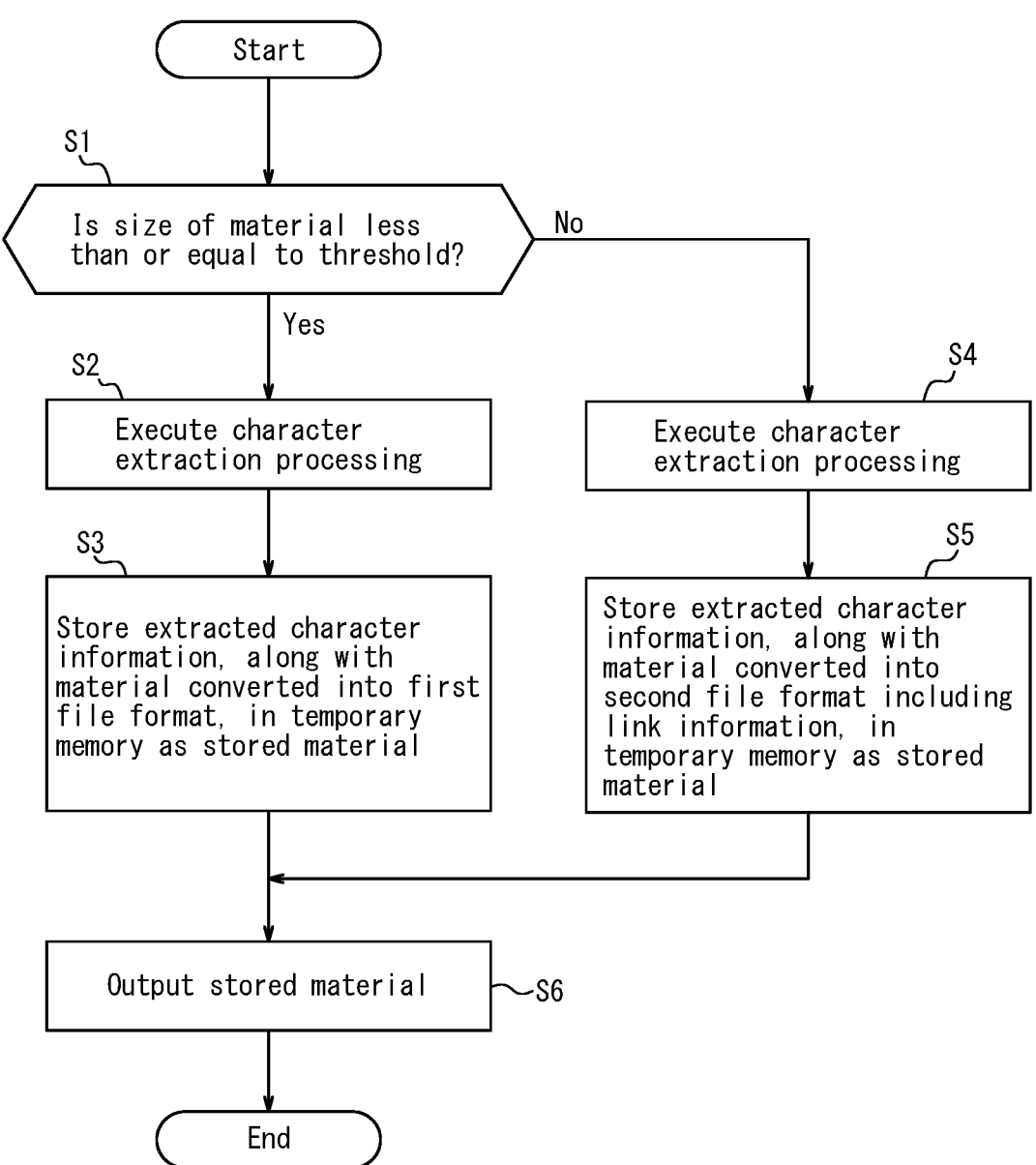
FIG. 4 is a flowchart illustrating operations of an information management apparatus included in the information search system according to the embodiment.

FIG. 4 is a flowchart illustrating operations of the information management apparatus 110. The information management apparatus 110 acquires new material that has been stored in any of the local databases 104 located in the plurality of districts, for example, regularly. In another example, the information management apparatus 110 may acquire new material as soon as it has been stored in a local database 104.

In a case in which the size of the acquired material is less than or equal to a threshold (Yes in Step S1), the information management apparatus 110 proceeds to processing of Step S2. In one example, the threshold is 1 MB.

The information management apparatus 110 executes character extraction processing of extracting only character information from the acquired material (Step S2). The character information is stored in the database 12, to be used to speed up text-based retrieval processing performed by the retrieval executor 40.

The information management apparatus 110 converts the material of a size less than or equal to the threshold into the first file format. The first file format is a file format that allows the entire material to be compressed, so that it can be downloaded directly by a searcher from the search screen (refer to FIG. 6). The first file format may be, for example, a Portable Document Format (PDF). The information management apparatus 110 then stores the extracted character information, along with the material converted into the first file format, in the temporary memory 112 as stored material (Step S3).

In a case in which the size of the acquired material is not less than or equal to the threshold (No in Step S1), the information management apparatus 110 proceeds to processing of Step S4.

The information management apparatus 110 executes character extraction processing of extracting only character information from the acquired material (Step S4). The processing of Step S4 is the same as that of Step S2.

The information management apparatus 110 converts the material of a size greater than the threshold into the second file format. The second file format is a file format that includes link information for the entire material or for any part of the material other than the character information. The link is where the material acquired by the information management apparatus 110 has been originally stored, that is, a local database 104 for a certain district. A searcher can access the material in the linked local database 104 from the search screen (refer to FIG. 6). The second file format may be, for example, a HyperText Markup Language (HTML) format. The information management apparatus 110 then stores the extracted character information, along with the material converted into the second file format, in the temporary memory 112 as stored material (Step S5).

The information management apparatus 110 outputs stored material in the temporary memory 112 to the database 12, for example, regularly (Step S6).

Now, if a large amount of material generated in the plurality of districts is stored in the database 12 as it is, high-speed search may not be possible due to an increased size of the database 12. Besides, the capacity of the database 12 and the capacity of the temporary memory 112 need to be increased. In the present embodiment, the information management apparatus 110 performs the above processing, and character information, along with compressed material or link information, is stored in the database 12 and in the temporary memory 112. That is, a size increase of the database 12 can be prevented, and thus, high-speed search is possible by the information search system according to the present embodiment. Further, since an increase of capacity of the database 12 and an increase of capacity of the temporary memory 112 can be prevented, a compact system can be configured. In one example, the information management apparatus 110 can compress material containing an image of greater than or equal to 3 MB to approximately 5 kB, by converting it into HTML as the second file format.

Figure 5:
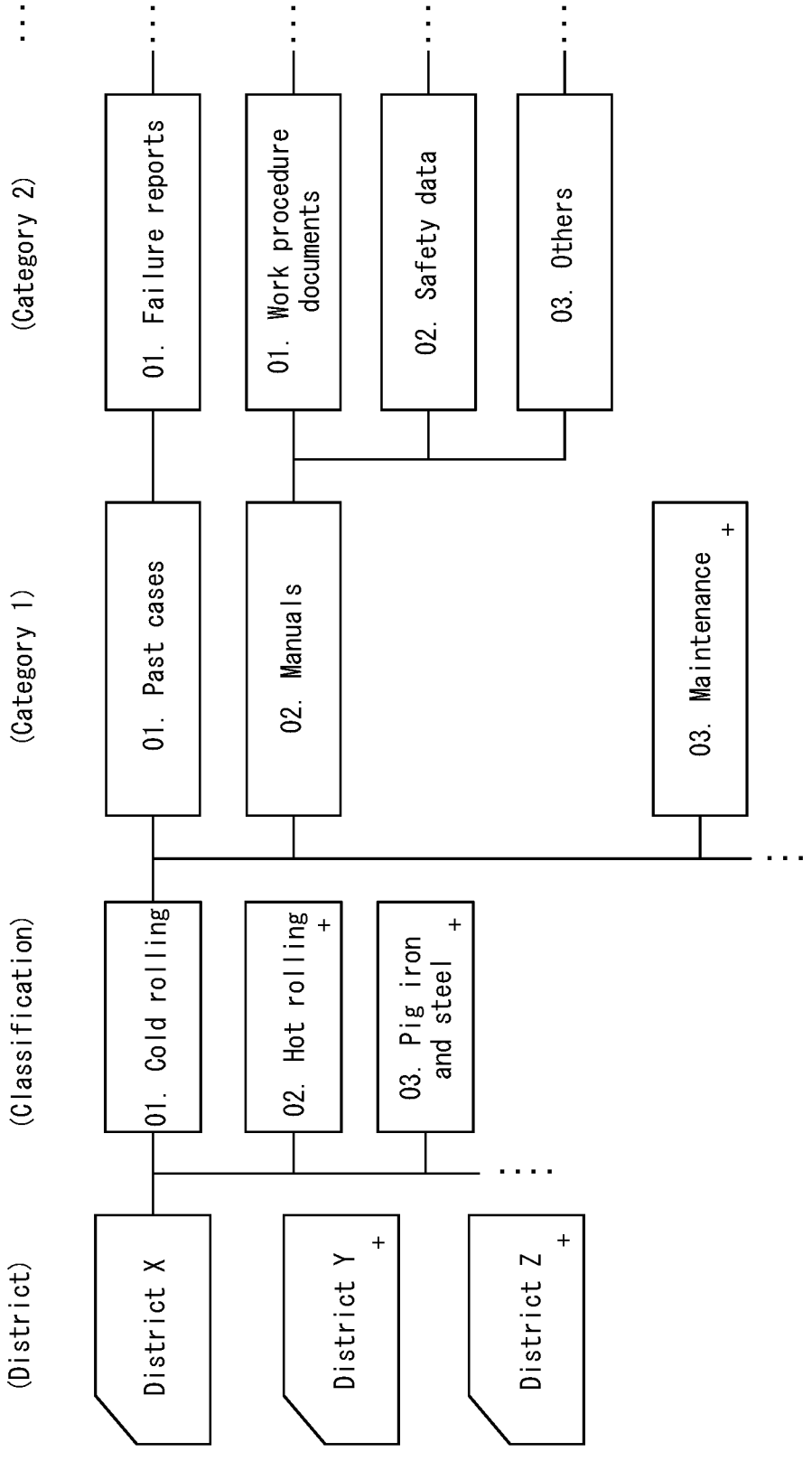
FIG. 5 illustrates a hierarchical structure of a database.

Herein, each of the local databases 104 located in the plurality of districts preferably has a common hierarchical structure with the database 12. FIG. 5 illustrates the hierarchical structure of the database. For example, the hierarchical structure includes, from the top level, District, Classification, Category 1, Category 2, or the like. The local database 104 for district X has a hierarchical structure of folders as illustrated in FIG. 5 in a specific example. This hierarchical structure is the same as the database 12, and it is preferably common to district Y and district Z. In this way, the local database 104 has the same hierarchical structure as the database 12. Consequently, a searcher can easily recognize a storage location of material that is displayed with a link in the search results, that is, material wherein the material body is stored only in the local database 104.

Moreover, because the database 12 and each local database 104 have a hierarchical structure of folders as illustrated in FIG. 5, material, such as drawings or photographs, that does not contain character information can be accurately retrieved. As described above, in a case in which material includes drawings and photographs, retrieval processing can be performed not only on embedded characters but also on file names. By file names including a hierarchy of folders as illustrated in FIG. 5, the content of material can be more accurately determined during retrieval processing.

For example, suppose that two photographs with the file name "apparatus BB" that do not contain character information are stored under the folder named "past cases" and the folder named "manuals" in a local database 104 for district X. In character extraction processing (Step S2 or Step S4 in FIG. 4), the information management apparatus 110 sets character information for "apparatus BB" stored under the folder named "past cases" to, for example "district X ¥ cold rolling ¥ past cases ¥ apparatus BB." Similarly, in character extraction processing, the information management apparatus 110 sets character information for "apparatus BB" stored under the folder named "manuals" to, for example, "district X ¥ cold rolling ¥ manuals ¥ apparatus BB." That is, in a case in which material does not contain character information, the information management apparatus 110 executes character extraction processing of extracting a file name and a folder path of the material as character information. Thus, character extraction processing executed by the information management apparatus 110 allows material that does not contain character information and that is not distinguishable by its file name to be stored in the database 12 in a manner such that it is distinguishable. Further, since the character information for such material contains a folder path, the content of the material can be inferred. For example, when retrieving an "actual example of failure of apparatus BB", the retrieval executor 40 can extract material with the character information "district X ¥ cold rolling ¥ past cases ¥ apparatus BB" as retrieved information, while excluding material with the character information "district X ¥ cold rolling ¥ manuals ¥ apparatus BB." Similarly, when retrieving a "method of operating apparatus BB", the retrieval executor 40 can extract material with the character information "district X cold rolling ¥ manuals ¥ apparatus BB" as retrieved information, while excluding material with the character information "district X cold rolling ¥ past cases ¥ apparatus BB." Moreover, when retrieving the "appearance of apparatus BB in district Y", the retrieval executor 40 can prevent the above material from being incorrectly included in retrieved information. Thus, material, such as drawings or photographs, that does not contain character information can be accurately retrieved. Although a case in which a hierarchy of folders is included in file names has been described, in another example, the information management apparatus 110 may extract a file name and a folder path separately and use each of them as a retrieval target. In a specific example, the information management apparatus 110 may extract "district X ¥ cold rolling ¥ past cases" and "apparatus BB" separately, and use them as character information.

Here, drawings and photographs are generally larger in size compared with documents. Accordingly, by setting a threshold (Step S1 in FIG. 4) to an appropriate value, the information management apparatus 110 can distinguish material, such as drawings and photographs, from document material. In this case, the information management apparatus 110 executes character extraction processing of Step S4 of FIG. 4 on the material, such as drawings and photographs, so as to convert it into the second file format that includes link information. That is, photographs that do not contain character information can be retrieved while they are stored in the local database 104, without being copied into the database 12. By executing character extraction processing of extracting a file name and a folder path of material as character information, it is possible to prevent photographs or the like that are stored in the local database 104 and that do not contain character information from being missed during retrieval, without having to increase the capacity of the database 12.

Here, character extraction processing and material compression processing are high-load processing for the information management apparatus 110, and it needs to have high-throughput specs for computing in order to process a large load. In the present embodiment, a scheduling function is used for the information management apparatus 110 to carry out processing on a district basis, and the processing load can therefore be alleviated. That is, a large load can be processed without requiring the information management apparatus 110 to have high computational throughput.

FIG. 6 illustrates search results that are displayed, for example, on a display apparatus 24 after retrieval processing. In the example of FIG. 6, the retrieval executor 40 performs retrieval processing from the database 12 in response to the query sentence "What is the cause of inverter tripping?", and acquires a plurality of pieces of retrieved information. In the following, the retrieved plurality of pieces of information may be referred to as "detected information." The detected information includes a mixture of information in a plurality of file formats into which original material has been converted according to the size by the information management apparatus 110. In the example of FIG. 6, primary information with an attached downloadable file, and secondary information with a link to material stored in a local database 104 are illustrated for example. The retrieval executor 40 retrieves the primary information and the secondary information that are stored in the database 12 as text as a result of character extraction processing executed by the information management apparatus 110. The retrieval executor 40 displays registration dates, reference numbers, registration districts, and outlines in the form of text. The retrieval executor 40 also displays downloadable files or links to the searcher as search results. Regardless of which file formats material is converted into by the information management apparatus 110, the searcher is able to know the full content of material included in the search results.

Further, in the present embodiment, the retrieval executor 40 can filter search results according to the aforementioned hierarchical structure of the database 12 and the local database 104, before they are displayed. This makes the search results easier to see.

FIG. 7 is a flowchart illustrating search processing operations of the information search system.

First, the query sentence acceptance unit 26 of the information search apparatus 10 accepts a query sentence that a searcher has entered on a terminal 20 of the searcher via the input apparatus 22 (Step S101).

Secondly, the natural language processor 28 performs natural language processing, such as morphological analysis, on the query sentence received by the query sentence acceptance unit 26, so as to extract words (independent words) (Step S102).

Thirdly, the inputted search keyword extractor 44 extracts (selects) an inputted search keyword from the words extracted by the natural language processing (Step S103).

Subsequently, the candidate search keyword reader 32 refers to keyword dictionaries (the shared keyword dictionary 30 and the local keyword dictionary 102), so as to read out keywords relevant to the inputted search keyword, as candidate search keywords (Step S104). At this time, in a case in which the inputted search keyword is not registered in the local keyword dictionary 102, the candidate search keyword reader 32 refers to the shared keyword dictionary 30.

The search keyword memory 34 stores the inputted search keyword, along with the candidate search keywords read out by the candidate search keyword reader 32 (Step S105).

The information search apparatus 10 causes the display apparatus 24 to display the search keywords stored in the search keyword memory 34, and, if necessary, allows the searcher to remove a search keyword unwanted by them from the displayed plurality of search keywords (Step S106).

The information-type determiner 36 refers to the information-type determining dictionary 38, so as to determine an information type (the purpose of search), based on an information-type determining keyword extracted by the information-type determining keyword extractor 46 (Step S107).

Using selected search keywords, the retrieval executor 40 performs text-based retrieval processing for example on information stored in a group in the database 12 that corresponds to the information type determined by the information-type determiner 36 or to an information type manually selected by the searcher (Step S108).

The information search apparatus 10 displays search results on the display apparatus 24 of the searcher (Step S109).

Figure 8:
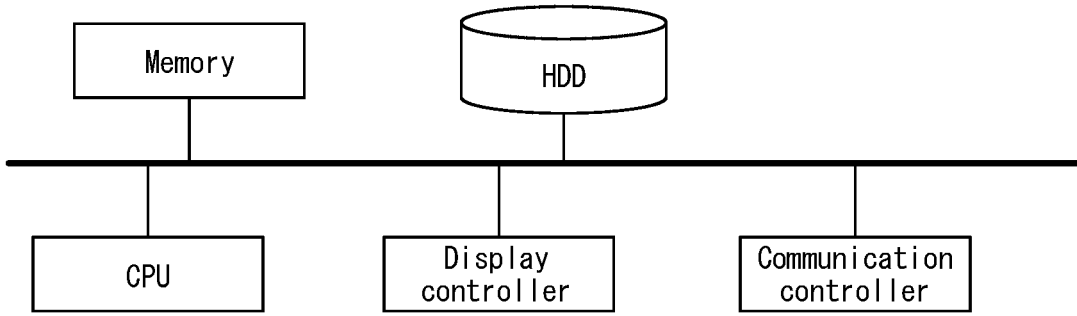
FIG. 8 is a functional block diagram illustrating a computer.

Herein, the information search apparatus 10, a terminal 20 of a searcher, a local management apparatus 100, and the information management apparatus 110 may each be a computer as illustrated in FIG. 8. In the computer, a memory (storage), a CPU (processor), a Hard Disk Drive (HDD), the display apparatus 16 or a display controller that controls display of the display apparatus 24, a communication controller for connecting to the network 18, or the like are connected via a bus. An Operating System (OS) and application programs for implementing the processing in the above embodiment can be stored in the HDD, and when being executed by the CPU, they are read out from the HDD to the memory. If necessary, the CPU controls the display controller, the communication controller, or the like to perform necessary operations. Data that is being processed is stored in the memory and, if necessary, stored in the HDD. The aforementioned various functions are realized by systematic collaboration between hardware, such as the CPU or the memory, the OS, and necessary application programs.

As has been described, according to the information search system of the present embodiment with the above configuration, high-speed search is possible even in a case in which it is commonly used across a plurality of districts.

Although the present disclosure has been described based on the illustrated examples, it is not limited to the above embodiment, and various improvements and modifications can be made without departing from the gist thereof.

INDUSTRIAL APPLICABILITY

According to the present disclosure, an information search system by which high-speed search is possible even in a case in which it is commonly used across a plurality of districts can be provided.

REFERENCE SIGNS LIST

10 Information search apparatus
12 Database
14 Input apparatus
16 Display apparatus
18 Network
20 Terminal of searcher
22 Input apparatus
24 Display apparatus
26 Query sentence acceptance unit
28 Natural language processor
30 Shared keyword dictionary
32 Candidate search keyword reader
34 Search keyword memory
36 Information-type determiner
38 Information-type determining dictionary
40 Retrieval executor
42 Candidate search keyword change request acceptance unit
44 Inputted search keyword extractor
46 Information-type determining keyword extractor
100 Local management apparatus
102 Local keyword dictionary
104 Local database
110 Information management apparatus
112 Temporary memory

The invention claimed is:

1. An information search system, comprising:
a database configured to store a plurality of pieces of information that are text-searchable;

a query sentence acceptance unit configured to accept a query sentence in a natural language format;
an inputted search keyword extractor configured to extract an inputted search keyword from the query sentence;
a retrieval executor configured to execute retrieval processing from the database using the inputted search keyword, along with a keyword relevant to the inputted search keyword;
a local management apparatus configured to store district material in a local database; and
an information management apparatus configured to execute character extraction processing on the material stored in the local database and convert a file format of the material according to a size thereof, store the material in a temporary memory as stored material, and output the stored material to the database,
wherein, in a case in which the size of the material is less than or equal to a threshold, the information management apparatus converts the material to a first file format, and in a case in which the size of the material is not less than or equal to the threshold, the information management apparatus converts the material to a second file format that includes link information to the local database,
wherein the material includes a photograph that does not contain character information,
wherein, in a case in which the material does not contain character information, the information management apparatus executes character extraction processing of extracting a file name and a folder path of the material as character information.

2. The information search system according to claim 1, wherein the local database has a hierarchical structure that is same as the database.

3. The information search system according to claim 1, wherein the information search system comprises a plurality of the local management apparatuses that are located in a plurality of districts and that are connected to the information management apparatus via a network.

4. The information search system according to claim 1, wherein the database is configured to include a language retrieval processing database and a file storage area in which material acquired from the temporary memory is stored.

5. The information search system according to claim 4, wherein file management is performed using a same hierarchical structure in both the temporary memory and the file storage area included in the database.

* * * * *